J. B. RYDER.
Corn Planter.
No. 38,244.
Patented Apr. 21, 1863.
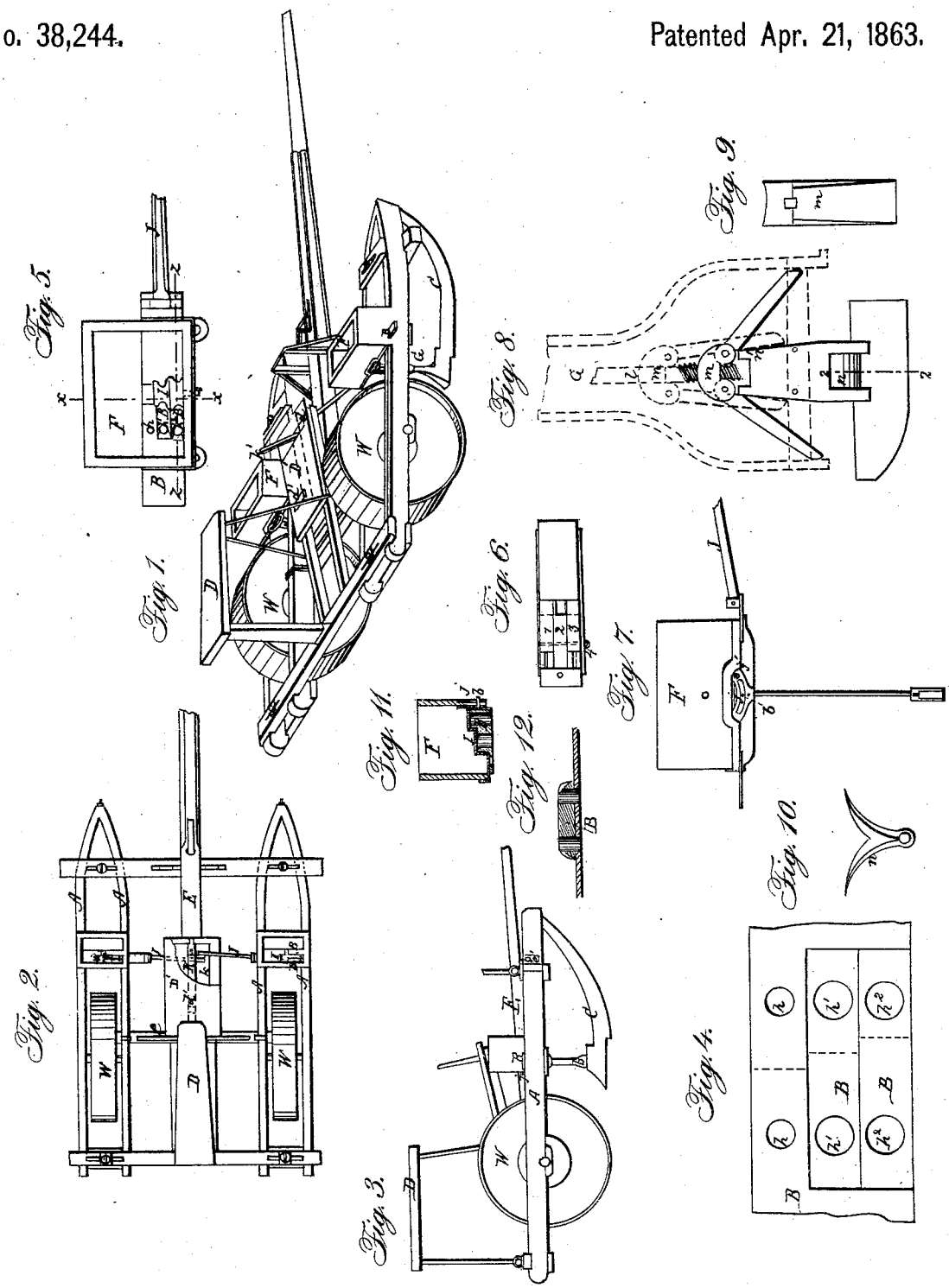
Witnesses:
Clinton Jackson
Inventor:
John Butler Ryder

UNITED STATES PATENT OFFICE.

JOHN B. RYDER, OF WAPELLO, IOWA.

IMPROVEMENT IN CORN-PLANTERS.

Specification forming part of Letters Patent No. 38,244, dated April 21, 1863.

*To all whom it may concern:*

Be it known that I, JOHN B. RYDER, of Wapello, in the county of Louisa and State of Iowa, have invented certain new and useful Improvements in Corn-Planters; and I do hereby declare the following to be a full and exact description of the same, reference being had to the accompanying drawings, making part of this specification, in which—

Figure 1 is a perspective view of a corn-planter illustrating my invention. Fig. 2 is a plan or top view of the same. Fig. 3 is a side elevation of the same. Figs. 4 to 12, inclusive, are detached views, which will be hereinafter referred to.

Similar letters of reference indicate corresponding parts in the several views.

The invention relates, first, to a novel construction of measuring apparatus or seeding-slide and its accessories; second, to a new and improved form of discharge-valve for accurately depositing the seed; third, to a peculiar construction of scatterer.

To enable others skilled in the art to which my invention appertains to make and use the same, I will proceed to describe its construction and operation.

A A A represent various parts of the main frame of the machine, the form of which is clearly shown in Figs. 1, 2, and 3. The front of the machine rests upon runners C C, which open furrows for the reception of the seed.

W W are broad carrying-wheels supporting the chief weight of the machine, and so placed as to follow in the tracks of the runner, and thus cover the seed and compress the earth about it.

D is the driver's seat, and D' the seat of the attendant who operates the dropping mechanism.

E is the draft-pole or tongue, hinged at its rear end to a transverse bar, $e$, and attached to the front of the machine at any height by means of a chain, $e'$, so as to limit the penetration of the runners C as may be needful.

F F are hoppers mounted on the frame above the rear part of the runners C and communicating therewith by vertical conducting-tubes G G.

B B are horizontal slides occupying the whole area of the hoppers, and working immediately above the stationary bottoms of the latter and beneath scrapers I I, formed with fluted edges, as shown in Figs. 2 and 5. The said slides are each formed with a series of apertures or bottomless cups, $h$ $h'$ $h^2$, arranged in pairs of unequal capacity, either in depth or diameter, and the stationary hopper-bottom beneath the slide is pierced with one aperture for each pair of cups in the slide, the said apertures being fitted with sliding gates 1 2 3, so that either pair of cups can be used at will to regulate the quantity of seed deposited, as shown in Fig. 6. A pin, 4, when inserted, holds the three gates in any position in which they may be placed.

Fig. 4 shows a full-sized view of one of the perforated slides B. Fig. 5 is a plan of one of the hoppers, showing the slide in position. Fig. 11 is a vertical section of slide and cut-off, through the line $x$ $x$ in Fig. 5. Fig. 12 is a vertical section of the seed-slide B, through the line $z$ $z$ in Fig. 5. Fig. 6 is a plan of the hopper-bottom beneath the slide, showing the center gate open and the others closed.

The slides B B are reciprocated through the medium of connecting-rods J J, attached to the lower end of a lever, $k$, which projects downward from a shaft, K, journaled beneath the seat D' and rocked by means of a lever, $k'$, in the hand of an attendant riding on the said seat. The lever $k'$ may be inserted in the rock-shaft K through either of the apertures $d$ or $d'$ in the seat, so that the attendant may face in either direction while working the slides.

The lower end of the conducting-tube is expanded into a bell form, as shown in Fig. 8, which represents in full size a vertical section of the lower end of the tube and its attachments, with the valves closed. The dotted blue lines represent the valves opened when the rod is raised by the action of the lever in discharging the seed.

$j$, Fig. 7, is a cam-slotted vibrating lever pivoted at $j'$ to the side of the hopper, and thrown up and down again at each motion of the slide by means of a pin, $b$, projecting from the edge of the slide B and traversing the cam-groove in the said lever. From the lever $j$ depends a rod, $l$, screw-threaded at its lower end for the reception of a double valve, $m$, which may be set up or down on the rod to regulate its action, as required. In the lower position of the lever $j$ and rod $l$ the valve $m$ rests upon a stationary bar, $n'$, which presses its leaves outward against the sides of the tube, so as to completely close its mouth. When the rod is drawn up, the leaves of the valve, falling by their gravity, open the mouth of the tube and drop the seed contained therein, as will be hereinafter more fully explained.

Fig. 9 represents one side or face of the double valve m. n is a scatterer secured to the bar n', directly beneath the mouth of the tube, and employed to scatter the seed as it falls from the tube. The form of this scatterer in its transverse section is shown in Fig. 10.

The operation is as follows: The attendant, being seated upon the seat D', facing the portion of the field already planted, or any marks which may be employed to indicate the position of the hills, throws the lever in one or the other direction at the instant the conducting-tubes at the rear end of the runners reach the place for the deposit of seed. Each forward or backward motion of the lever and corresponding motion of the slides carries the cups, which have been filled with seed, under the scrapers and over the apertures in the hopper - bottom through which the seed descends into the tube. The same action also opens and again closes the valves m, the said valves opening at the half-stroke of the slides, so as to deposit in the ground the charges of seed passed into the tubes at the previous motion of the slides, but closing again as the slides reach the extremities of their stroke, so as to catch the new charges and hold them ready for deposit at the next stroke. The seed falling upon the scatterer n is separated sufficiently in the hill, but, having a short distance to fall, is not liable to spread with irregularity or be scattered beyond proper limits.

It will be understood from this description that each conducting-tube deposits seed for a hill at each motion of the lever k' in either direction. The work having progressed in this way until the end of the "through" is reached, the driver shifts backward upon the seat D, so as to counterbalance the front of the machine and the attendant thereon, and thus enable the machine to turn freely upon its wheels. He then turns round and returns by the side of the last through, the attendant, if need be, facing about upon his seat and shifting his hand-lever k' to suit his new position.

Many advantages in the novel features of this machine might be cited. A few will be named. The peculiar form of the slides and the cups therein, sloping upward toward the center above the main surface of the slide and projecting horizontally forward in parallel ridges from the margins of the apertures, as shown in Figs. 11 and 12, and the corresponding form of the scrapers I, adapting them to strike the outsides of the holes before the centers, effectually prevent the cutting or breaking of the grain and keep it constantly rolling from each end toward the center of the hopper in such manner as to insure the filling of the cups at every stroke. The peculiar construction of final-delivery valve with the means of vertical adjustment is unfailing in its operation and not subject to derangement. The scatterer n, within the rear end of the runner, separates the falling seed as far as needful without scattering them unduly.

Having thus described my invention, what I claim therein as new, and desire to secure by Letters Patent, is—

1. The seed-slide B, constructed and operating in the manner and for the purpose set forth.

2. The cut-off I, constructed and operating in the manner and for the purpose set forth.

3. The combination of the slide B and cut-off I, substantially in the manner and for the purpose set forth.

4. The gravitating double delivery-valve m, constructed and operating in the manner and for the purposes explained.

5. The combination of the double scattering-bar n with the delivery-valve m, substantially as and for the objects specified.

JOHN B. RYDER.

Witnesses:
J. J. FOOR,
JAMES S. HURLEY.